United States Patent [19]

Schleinitz et al.

[11] 4,161,500
[45] Jul. 17, 1979

[54] PROCESS FOR LOW ATTENUATION METHACRYLATE OPTICAL FIBER

[75] Inventors: Henry M. Schleinitz, Kennett Square; Paul G. Stephan, Landenberg, both of Pa.

[73] Assignee: E. I. Du Pont de Nemours and Company, Wilmington, Del.

[21] Appl. No.: 842,166

[22] Filed: Oct. 14, 1977

[51] Int. Cl.² .................... D02G 3/00; B32B 27/00
[52] U.S. Cl. ........................... 264/1; 264/174; 428/373; 526/329.7
[58] Field of Search ............... 526/329.7; 264/1, 174; 428/361, 373

[56] References Cited

U.S. PATENT DOCUMENTS

| | | | |
|---|---|---|---|
| 2,008,719 | 7/1935 | Kuettel | 260/2 |
| 2,045,660 | 6/1936 | Loder | 260/2 |
| 3,154,600 | 10/1964 | Munn | 260/884 |
| 3,930,103 | 12/1975 | Chimura et al. | 428/361 |
| 3,993,834 | 11/1976 | Chimura et al. | 428/373 |
| 3,999,834 | 12/1976 | Ohtomo et al. | 350/96 GN |

FOREIGN PATENT DOCUMENTS 46-31973 9/1971 Japan .......................... 264/1

OTHER PUBLICATIONS

Balke et al., J. of Polymer Sci., vol. 17, pp. 905–949 (1973): "Bulk Polym. of Methyl Methacrylate".
Cardenas et al., J. of Poly. Sci. (Polym. Chem Ed.), vol. 14, 883–897 (1976): "High Conv. Polym. I".

*Primary Examiner*—Jay H. Woo

[57] ABSTRACT

Low attenuation, all-plastic optical fiber is made by using starting materials which are rigorously purified to remove light-absorbing impurities and solid particles of dirt, polymerizing the core monomer under pressure with a heating schedule which leads to at least 98% conversion to polymer as a cylindrical preform, and ram extruding the core of the optical fiber while melting only the forward end of the preform of core polymer so as to preclude contamination of the core by dirt or formation of bubbles by polymer degradation. Optical fibers so made exhibit light attenuations as low as 300 dB/km or lower.

28 Claims, 2 Drawing Figures

PROCESS FOR LOW ATTENUATION METHACRYLATE OPTICAL FIBER

BACKGROUND OF THE INVENTION

The present invention relates to optical fiber which has a polymer core, and cladding of polymer which has an index of refraction lower than that of the core.

Optical fibers are well known in the art for transmission of light along a length of filament by multiple internal reflections of light. Great care is taken to minimize light losses due to absorption and scattering along the length of the filament, so that light applied to one end of the optical filamentary material is efficiently transmitted to the opposite end of the material. The light transmitting portion or core of the optical filamentary material is surrounded by cladding having an index of refraction lower than that of the core, so as to achieve total internal reflection along the length of the filament. This cladding is normally chosen to be transparent since an opaque cladding tends to absorb or scatter light.

An important consideration in formation of optical fibers is minimization of any factor which increases the attenuation of transmitted light within such a fiber.

Optical fibers which consist wholly of inorganic glasses, or which have an inorganic glass core surrounded by a thermoplastic or thermosetting polymer, or which consist wholly of thermoplastic polymer, are all known in the art. Those having inorganic glass cores, especially fused silica cores, exhibit high light transmission, i.e., low attenuation of transmitted light, but are relatively easily damaged by fracture if bent to too small a radius of curvature or otherwise abused; they can be protected by use of a shielding layer, but this adds undesired bulk, weight and expense, and nevertheless does not always enable the fiber to be used in situations where bending to a small radius of curvature is helpful or required. The all-plastic fibers are less subject to fracturing, but have the deficiency that they more strongly attenuate light passing therethrough. The present invention is directed to improving the capability of all-plastic optical fibers to transmit light. It is also directed to a process for making high quality polymers of methyl methacrylate which are preeminently suitable for the core component of optical fibers.

SUMMARY OF THE INVENTION

According to the present invention, there is provided an improved process for making an optical fiber which consists essentially of organic high polymers, said fiber consisting of a core and cladding, said core being fabricated of a first polymer which contains a major proportion of methyl methacrylate units, which comprises the steps (1) (a) mixing in a sealed system vinyl monomers of which at least 60 mol % is methyl methacrylate, said monomers containing 0 to 10 ppm biacetyl and 0–500 ppb of transition metal ions and being substantially free of particulate matter, with a free radical polymerization initiator and a chain transfer agent;

(b) transferring said mixture in a sealed system to a polymerization vessel, and closing said vessel;

(2) maintaining said mixture without a free liquid surface in said vessel under a pressure of 7-25 kg/cm², while simultaneously: maintaining the temperature of said mixture below about 70° C. until conversion to polymer is at least 60% complete dilatometrically, raising the temperature at a rate to reach a temperature of 90° to 100° C. at the time that conversion to polymer is at least 95% complete dilatometrically, and continuing to raise the temperature at about the same rate to a temperature in the range of 115° to 140° C., holding the temperature in said range for at least a half hour and cooling to form a solid preform of said first polymer;

(3) (a) transferring said solid preform of said first polymer to the barrel of a ram extruder adapted to receive it;

(b) advancing said solid preform through said barrel with a ram into a heated zone, whereby said preform is softened only at its forward end, and extruding said core of said fiber, and (c) applying to said core a second polymer which is substantially amorphous and which has an index of refraction below that of said first polymer, to form said cladding of said fiber.

DESCRIPTION OF THE PREFERRED EMBODIMENTS

Figure 1:
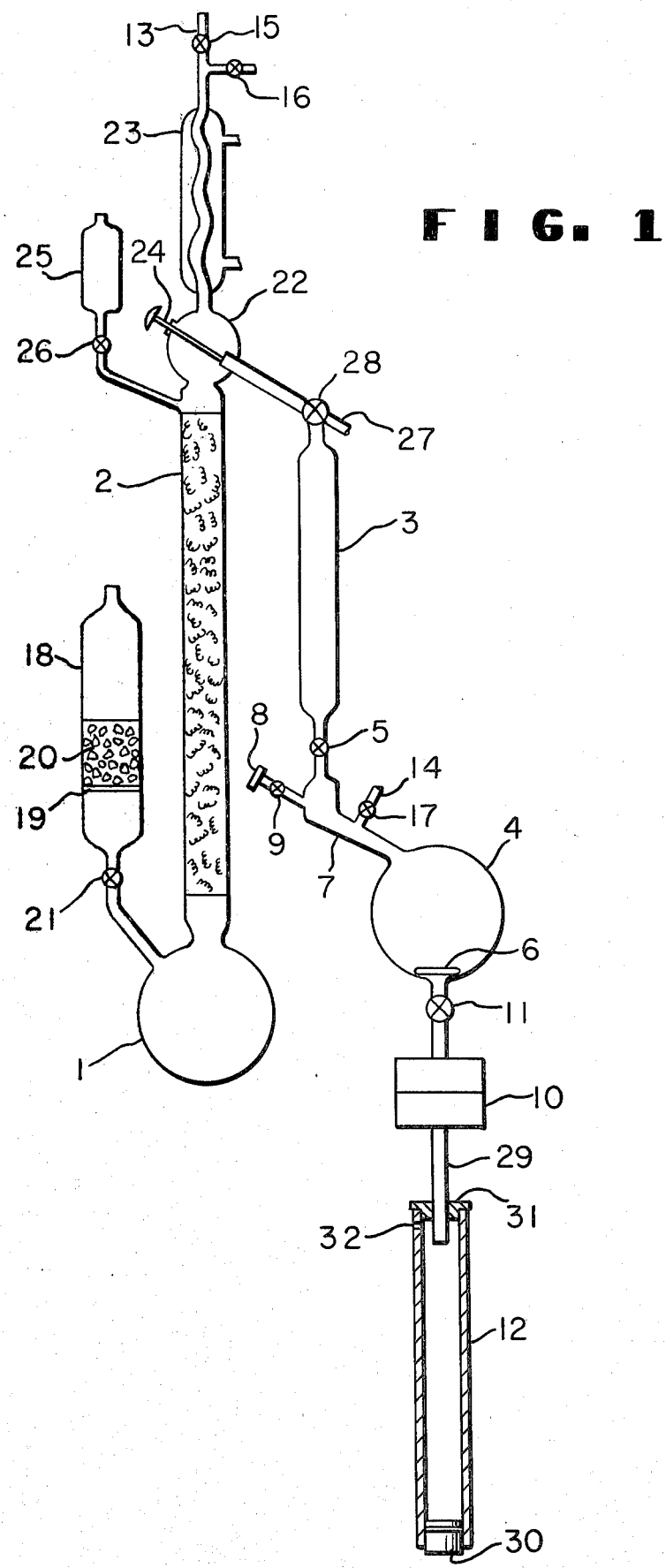
FIG. 1 is a schematic drawing, not to scale, of apparatus suitable for purifying methyl methacrylate and charging the polymerization vessel.

Pursuant to making an all-plastic optical fiber capable of high transmission of light therethrough, it is important to use monomer of high quality. To this end, it is important to remove from the monomers, especially those from which the core of the fiber will be made, those substances which if retained would absorb or scatter light introduced into the optical fiber made therefrom.

In the present invention, the core of the fiber is a copolymer containing at least 60 mol %, preferably at least 80 mol %, most preferably at least 90 mol % of methyl methacrylate, or polymethyl methacrylate polymer itself. As the copolymer component, monomers such as acrylic esters, e.g., methyl acrylate, ethyl acrylate, propyl acrylate and butyl acrylate; methacrylic esters, e.g., cyclohexyl methacrylate, benzyl methacrylate, ethyl methacrylate, propyl methacrylate and butyl methacrylate; or styrene may be used. However, it is preferred that at least 90 mol % of the core polymer be composed of methyl methacrylate, so as to have high light transmission. The most highly preferred copolymers are those prepared from at least 95 mol % of methyl methacrylate and 0 to 5 mol % of methyl acrylate, ethyl acrylate or ethyl methacrylate. The copolymers are preferred because they have greater flexibility, and are less subject to thermal depolymerization, compared to homopolymer of methyl methacrylate.

Partially or completely deuterated vinyl monomers can also be used to make polymers for optical fibers. The resulting fibers, like their non-deuterated counterparts, are optically transparent, the wavelengths at which minimum attenuation of transmitted light occurs being shifted. A particularly useful deuterated monomer is methyl methacrylate-$d_8$. Lowest attenuation of light at the wavelengths of maximum transmission is attained as the amount of C—H bonds (as distinct from C—D bonds) in the core polymer is minimized. The best results are attained by using deuterated monomer of such isotopic purity, and amounts of initiator and chain transfer agent such that the core of the optical fiber contains less than 20 mg, preferably less than 10 mg, most preferably less than 1 mg, of hydrogen (as distinct from deuterium) per gram of polymer, as measured by nuclear magnetic resonance at 60 MHz.

It is important to remove from the monomers impurities which absorb light of wavelengths which the optical fiber is intended to carry. It has been found that methyl methacrylate ordinarily contains biacetyl, and that the amount of biacetyl should be reduced to no more than about 10 ppm (parts per million), preferably no more than 5 ppm. Removal of the impurities can be accomplished by treatment with alumina, followed by distillation.

Although any type of alumina can be used, for most effective removal of impurities it is best to use basic alumina and that it be of activity grade 1. Such treatment removes or reduces the amount of compounds having labile hydrogen and of highly polar compounds such as biacetyl. The treatment can be accomplished prior to distillation of the monomer by placing the alumina on a filter which will retain it, and filtering the monomer through the alumina directly into the still pot. This operation is suitably carried out under a nitrogen atmosphere.

In the step of distilling the methyl methacrylate or other monomer, only a center cut of distillate is retained for polymerization, while substantial foreshot and heel fractions are discarded.

Another method of purification which can be used is preparative scale gas - liquid chromatography. Distillation is a preferred method, and will be the method referred to in the detailed description below.

Transition metal ions, especially those of transition elements of the first series (i.e., elements of atomic number 22 through 28), and copper, lead, aluminum, silicon, vanadium, chromium, manganese, iron and nickel are also deleterious impurities, because they absorb light of wavelengths which the optical fiber is intended to carry. The amount of such impurities can also be conveniently lowered to acceptable levels by distillation. The amount of such impurities should be no greater than about 500 ppb (parts per billion), preferably no greater than 100 ppb, total for all such ions present.

Particulate matter should also be removed because these particles absorb and/or scatter light. To the extent possible, the monomers (and the other components of the polymerization charge) should be substantially free of such particulate matter. Although particles smaller than about 200 nm (0.2 μm) cannot be resolved with an optical microscope, with the use of a transverse intense beam of light in an optical microscope points of light are observed in an optical fiber not only at the particles which are larger than about 200 nm, but also at smaller particles of undetermined size. Even though it is not possible to precisely determine the sizes of these particles, it is nevertheless important to remove those, regardless of size, which are detectable by light scattered from the particle. Particles of all sizes can be effectively removed by distillation of the monomers, providing that the distillation is carried out such that there is no entrainment. The best (i.e., cleanest) commercially available polymers have on the order of 300 to 1000 particles/mm$^3$, and can provide optical fibers with attenuations of light down to ca. 500 dB/km and having at best a few short lengths as low as 400 dB/km. By the present invention, optical fibers having no more than 100 particles/mm$^3$ are easily made. Particle counts below 10 particles/mm$^3$ are also easily attained by the present invention, and counts below 2 particles/mm$^3$ have been attained. Accordingly, in reference to the monomers, by "substantially free" is meant that the mixed vinyl monomers contain no more than about 100 particles/mm$^3$.

Any comonomer used should be similarly purified, but such purification ordinarily need not be as rigorous, especially when the amount used is less than 10 mol % of the total monomer because less impurity is introduced with the smaller quantity of monomer and is diluted upon mixing the monomers.

When distillation is employed as the method of purification, the distillation is conducted under a slight positive pressure of an inert gas such as argon, nitrogen or helium. As is known in the art, so as to prevent polymerization of monomer in the fractionating column, a concentrated solution of polymerization inhibitor in the same monomer is introduced at the top of the column throughout the fractionation.

Polymerization is carried out with the use of a soluble free radical polymerization initiator, ordinarily an azo type initiator. For the sake of convenience, the initiator type and concentration are chosen to provide about 50% conversion to polymer in about 16 hrs. To achieve this, it is preferred to use an initiator having a half-life at 60° C. between about 300 and 3,000 minutes, preferably about 1,000 minutes. 2,2'-azo-bis(isobutyronitrile) is the preferred initiator because it is available in high purity and because it can be handled safely. Other initiators with somewhat longer or shorter half-lives, such as 1,1'-azo-bis(cyclohexanecarbonitrile) or 2,2'-azo-bis(2,4-dimethylvaleronitrile), can also be used; for those having longer half-lives, the temperatures of the heating stages used during polymerization, especially the first stage, will have to be higher than when 2,2'-azo-bis(isobutyronitrile) is used, and/or greater amounts can be used, and conversely, for those having shorter half-lives, the temperatures of the heating stages used during polymerization, especially the first stage, will have to be lower, and/or smaller amounts may be used. It will be clear to one skilled in the art that many combinations of initiator, initiator concentration and polymerization temperature can be used. Combinations of initiators having different half-lives can also be used. The initiator and its concentration are so chosen that some will remain for the later heating stages of the polymerization step. A high purity initiator should be used so as to introduce the least possible amount of impurity into the resulting polymer.

A chain transfer agent is also included in the polymerization system. Both mono- and multifunctional chain transfer agents can be used. Typical examples include n-butyl mercaptan, lauryl mercaptan, mercaptoacetic acid, 2,2'-dimercaptodiethyl ether, ethylene bis(2-mercaptoacetate) commonly referred to as glycol dimercaptoacetate (GDMA), ethylene bis(3-mercaptopropionate), 1,1,1,-trimethylolethane tris(3-mercaptopropionate), pentaerythritol tetrakis (3-mercaptopropionate). For reasons not entirely understood, the preferred chain transfer agents are those having mercaptan groups on carbon atoms adjacent to the carbonyl of a carboxylic functional group, i.e., of the type disclosed in U.S. Pat. No. 3,154,600, and having mercaptan difunctionality, because their use generally provides polymer of higher conversion and optical fiber having higher light transmission when compared to those prepared with other chain transfer agents. It is preferred to purify the chain transfer agent, which can be done by distillation.

The quantities of initiator and chain transfer agent are so chosen to give a polymer having an inherent viscosity of at least about 0.4 dl/g, as measured at 25° C. on a 0.5% (wt./vol.) solution in chloroform (i.e., 0.5 g of polymer in 100 ml. of solution). At inherent viscosities of 0.38 dl/g or lower the polymer is more brittle, while at 0.4 dl/g and higher the polymer is reliably tough. Although polymers having inherent viscosities as high as 0.5 and 0.6 can be used, they are difficult to extrude because they are so viscous at temperatures which are suitable for extrusion without polymer degradation that special heavy duty equipment is required. Polymers having an inherent viscosity in the range 0.40 to 0.44 are tough and do not require heavy-duty equipment, and thus are preferred. Further, it is difficult to extrude the very high viscosity polymer into fibers having a smooth, fracture-free surface, as most often the extrudate will have a fractured surface which directly causes a much higher attenuation of transmitted light. To achieve an inherent viscosity in the preferred range, appropriate amounts of the polymerization initiator and chain transfer agent are easily determined empirically. The polymerization initiator is ordinarily used in an amount of about 0.001 to 0.05 mol %, based on the total monomer and for the preferred initiator preferably 0.01 to 0.02 mol %, and the chain transfer agent is ordinarily used in an amount of about 0.1 to 0.5 mol %, based on the total monomer, and for the preferred difunctional chain transfer agents preferably in the range of 0.1 to 0.25 mol %.

It has also been found important to minimize the amount of foreign particles in the core polymer, because they absorb or scatter light and thus increase the attenuation of transmitted light in the fiber. The process of the present invention is therefore designed to meet this goal. Transfers of the various substances are carried out to the extent possible in a sealed or closed system so that recontamination of purified materials by dust, dirt or particulate matter of any kind does not occur. Particles introduced by adventitious contamination are advantageously removed as the polymerization charge is transferred to the polymerization vessel. Removal of particles larger than a size within the range 0.2 to 1 $\mu$m is conveniently done at this stage. Particles can be removed by filtration or centrifugation. Filtration is preferred because of its convenience.

It has been found useful to use for the first phase of the process, which is preparation of the polymerization mixture, a series of connected receivers and vessels as depicted schematically in FIG. 1, beginning with a still for the major component of the polymerization mixture, methyl methacrylate, going through holding and mixing vessels, and ending with the polymerization vessel. A convenient sequential arrangement begins with a still pot 1 equipped with a column 2 packed, for example, with glass helices, and having a volumetrically calibrated receiving vessel 3 which is connected to a mixing vessel 4 by a line which is equipped with a greaseless stopcock or other type of greaseless valve 5. The mixing vessel 4 is equipped with a magnetically driven stirrer 6 and an entrance port 7 which is sealed by a serum stopper 8 and a stopcock 9, and is connected to a microporous filter 10 by a line which is equipped with a greaseless stopcock 11 or other type of greaseless valve. Although, in the arrangement shown, distilled monomer is introduced into the mixing vessel 4 through the entrance port 7, other arrangements are also possible wherein the monomer is transferred from receiver 3 to vessel 4 through a line separate from the entrance port 7. The filter 10 is of known type which is inert to all constitutents of the polymerization mixture, such as polytetrafluoroethylene, supported on a porous metal plate. The pore size of the filter can range from 1 micrometer down to about one-twentieth of the wavelength of light to be carried by the optical fiber, and is preferably in the range of 0.2 to 1 micrometer. The filter 10 is in turn connected by a line 29 to the polymerization vessel 12. An inert atmosphere, such as argon, helium or nitrogen, is maintained throughout the whole arrangement of apparatus by introduction through gas inlets 13 and 14, and its flow is controlled and directed by the various stopcocks 15, 16, 17 and others shown. The various elements of the apparatus can be broken down into smaller units by ground glass joints, ring seals, or other known means not shown.

Procedurally, methyl methacrylate is introduced into still pot 1 through a filtering vessel 18 which contains a filter element 19 which supports a bed of alumina 20. Following charging of the pot, stopcock 21 is closed. The packed column 2, still head 22, condenser 23 and needle valve 24 function in known manner to control take-off of distillate. Polymerization inhibitor is introduced from a liquid reservoir 25 and its flow is controlled by stopcock 26.

A foreshot to be discarded is removed through outlet 27 controlled by stopcock 28. The desired center distillate fraction is collected in the receiving vessel 3. A first portion of distilled methyl methacrylate is transferred through the connecting line from the distillation receiver to the mixing vessel 4. Separately, there is prepared a solution of the desired polymerization initiator and chain transfer agent in the desired amounts in the comonomer, or, if no comonomer is used, in a small, measured amount of separately purified methyl methacrylate; this solution is introduced into the mixing vessel through the entry port 7 with the aid of a hypodermic syringe inserted through the serum stopper 8 and stopcock 9. A second portion of distilled methyl methacrylate is transferred through the connecting line from the distillation receiver 3 to the mixing vessel 4. The purpose of reserving part of the methyl methacrylate for the final addition to the mixing vessel is for washing all traces of the minor components of the polymerization mixture, i.e., the comonomer, polymerization initiator and chain transfer agent, from the entry port 7 into the mixing vessel 4; loss of part of the minor components by adhering within the entry port would lead to a greater degree of nonuniformity of the resulting polymer among successively run polymerizations, as compared to the loss of a trace of the major constituent, methyl methacrylate, within the entry port. The combined materials are thoroughly mixed with the magnetic stirrer 6 to assure homogeneity. The mixture is then passed through the filter 10, and into the polymerization vessel 12.

It has now been found desirable to minimize exposure of the core polymer to any circumstance or condition which will lead to degradation of the polymer as by heat or shear stress, formation of bubbles, or introduction of any solid particulate matter. Accordingly, polymerization and extrusion procedures have been designed to minimize both exposure of the polymer to adverse conditions, and contact of the polymer with any other material or surface, during the remaining manipulative steps. To this end, ram extrusion of a solid block of polymer is employed for extrusion of the core of the fiber, inasmuch as use of a screw extruder, which entails extensive contact of the polymer with metal surfaces, can lead to contamination by foreign particles, extensive heating, shear stress, with possible degradation of polymer, and introduction of bubbles. Therefore, according to the present invention, the polymer is prepared in the shape of a preform suitable for the barrel of the ram extruder to be used in making the core of the optical fiber.

The polymerization vessel 12 is thus of a shape to make the required polymer preform. Because of the manner in which a ram extruder operates, the preform will ordinarily be in the shape of a rod. Although rods of various cross-sectional shapes could be used, a circular cross-section is most suitable, because the most convenient cross-sectional shape for fabrication of the polymerization vessel and extruder barrel is circular. Additionally, polymer rods which are cylindrical are preferred because such rods lead to maximum uniformity during extrusion, and thus an optical fiber core having more uniform properties. The polymerization vessel 12 is fabricated of metal of sufficient thickness to withstand the pressure level to be employed during polymerization, typically a pressure in the range of 7 to 25 kg/cm$^2$. Suitable materials of construction include the stainless steels. So as to preclude contamination of the polymer by transition metal ions at even the parts-per-billion level, it is preferred to plate the cavity of the polymerization vessel with an inert metal such as gold or chromium. The polymerization vessel 12 is sealed at its lower end with a piston 30 having a gasket.

Following transfer of the polymerization mixture from the mixing vessel 4 through the filter 10 and line 29 to the polymerization vessel 12, the polymerization vessel is removed from the sealed or closed system described above by removal of plug 31 and immediately sealed with a piston (not shown) which is like piston 30 and which fits its cylindrical cavity. Sealing with the piston is done without delay so as to avoid contamination by dust or any foreign substance by exposure to the atmosphere. The gasket of each piston is fabricated of a material which is inert to all components of the polymerization mixture at the temperatures employed, such as polytetrafluoroethylene, to prevent contamination of the polymerization mixture and resulting polymer.

The polymerization should be carried out without any free gas space being present in the polymerization vessel. The presence of gas in such space results in gas being present in the polymer preform, both dissolved therein and in the form of bubbles, which leads to an extruded core which contains bubbles or voids and thereby attenuates transmitted light more than a core without bubbles or voids. So that the polymerization mixture will have no free liquid surface during polymerization, various methods can be used to exclude all free gas space from the vessel. One suitable method is to fabricate the polymerization vessel 12 with a bleed hole 32 of small diameter (typically less than 1 mm) located a short distance from the open end of the vessel. The vessel is filled with polymerization mixture to above the bleed hole, and the piston seal is put into place and pushed into the cavity until all free gas and excess liquid mixture is forced from the bleed hole and the piston seals off the liquid in the major part of the cavity so that it is isolated from the bleed hole. There is no danger of loss of material through the bleed hole during polymerization, inasmuch as the mixture assumes a smaller volume during polymerization, as will be discussed in greater detail below.

The polymerization is carried out under pressure, suitably 7 to 25 kg/cm$^2$ (100 to 350 psig), to preclude vaporization of monomer and consequent formation of bubbles or voids in the polymer preform, for reasons similar to those set forth in the previous paragraph. Pressure is maintained by applying force against the piston seals throughout the reaction with a press.

Maintaining the polymerization mixture under pressure also provides a means of assessing the progress of polymerization, which information is used during the course of polymerization in setting the heating program employed. By maintaining the polymerization mixture under pressure, it is possible to follow the progress of the polymerization dilatometrically, i.e., by following the change in volume of the mixture. As noted above, the mixture assumes a smaller volume upon polymerizing, the polymer occupying a volume of the order of about 80% of that of the monomers. Progress of the polymerization can be followed, for example, by placing an index mark on the rod used to transmit force to one of the piston seals at such a position that it will remain visible outside the cavity of the polymerization vessel throughout the polymerization, and following its change in position with a cathetometer. From the initial volume of the reactants employed, the final volume of polymer to be prepared as determined if necessary from preliminary runs, and the initial position of the index mark, it is a simple matter to estimate where the index mark will be when polymerization has progressed to any given percentage of completion. It should be borne in mind, however, in view of the different thermal coefficients of expansion of the polymerization vessel and mixture therein, and the progressive heating to higher temperatures during the course of the reaction, that the cathetometer measurements may not provide a direct indication of conversion to polymer unless corrections are applied, and may differ from data made under constant conditions by as much as a few percent. It is found in practice that final cathetometer readings almost invariably indicate an apparent contraction in volume of greater than 100%, and sometimes as much as 103%, of that to be expected. Subsequent determination of residual unreacted monomer in the polymer made in such runs shows the presence of a small, variable amount of unreacted monomer. For present purposes polymerization should be at least 98%, preferably 99%, complete. Typically, conversions to polymer of 99.1 to 99.3% can be routinely attained in the present invention.

The polymerization mixture is carefully and progressively heated to higher temperatures in such manner as to attain at least 98% conversion to polymer, but to prevent development of an uncontrolled or "runaway" reaction, which would lead to a thermally degraded product. The mixture is first maintained below about 70° C., preferably between 60° C. and 70° C., until conversion to polymer is at least 60% complete, preferably 65 to 75% complete. The mixture is next heated to raise the temperature at a rate to reach 90° to 100° C. at the time that conversion to polymer is at least 95% complete. Heating to raise the temperature at about the same rate is continued until a temperature in the range of 115° to 140° C., preferably 125°–135° C., is attained, and finally a temperature in the same range is maintained for at least one half hour, preferably at least one hour. The resulting polymer is then cooled. Pressure in the range of 7 to 25 kg/cm$^2$ is maintained during the entire heating program. The pressure is released only after the temperature of the polymer has dropped below 100° C., which is the boiling point of methyl methacrylate, so as to preclude formation of bubbles by traces of residual monomer.

Depending on the diameter of the cavity of the polymerization vessel, and thus on the diameter of the polymer preform to be prepared, the specific rate of heating will vary to some extent, but the conditions will always conform to the schedule of the previous paragraph. For example, when the diameter is 28.7 mm (1.13 in), after attaining a conversion to polymer of at least 60% below a temperature of 70° C., the mixture is heated to raise the temperature at a rate of 35° to 45° C. per hour until a temperature of 115° to 140° C. is attained, which rate will result in at least 95% conversion to polymer when a temperature of 90° to 100° C. is attained. For smaller diameters, a rate of temperature increase which is the same or faster can be used. For larger diameters, a slower rate of temperature increase is required.

Figure 2:
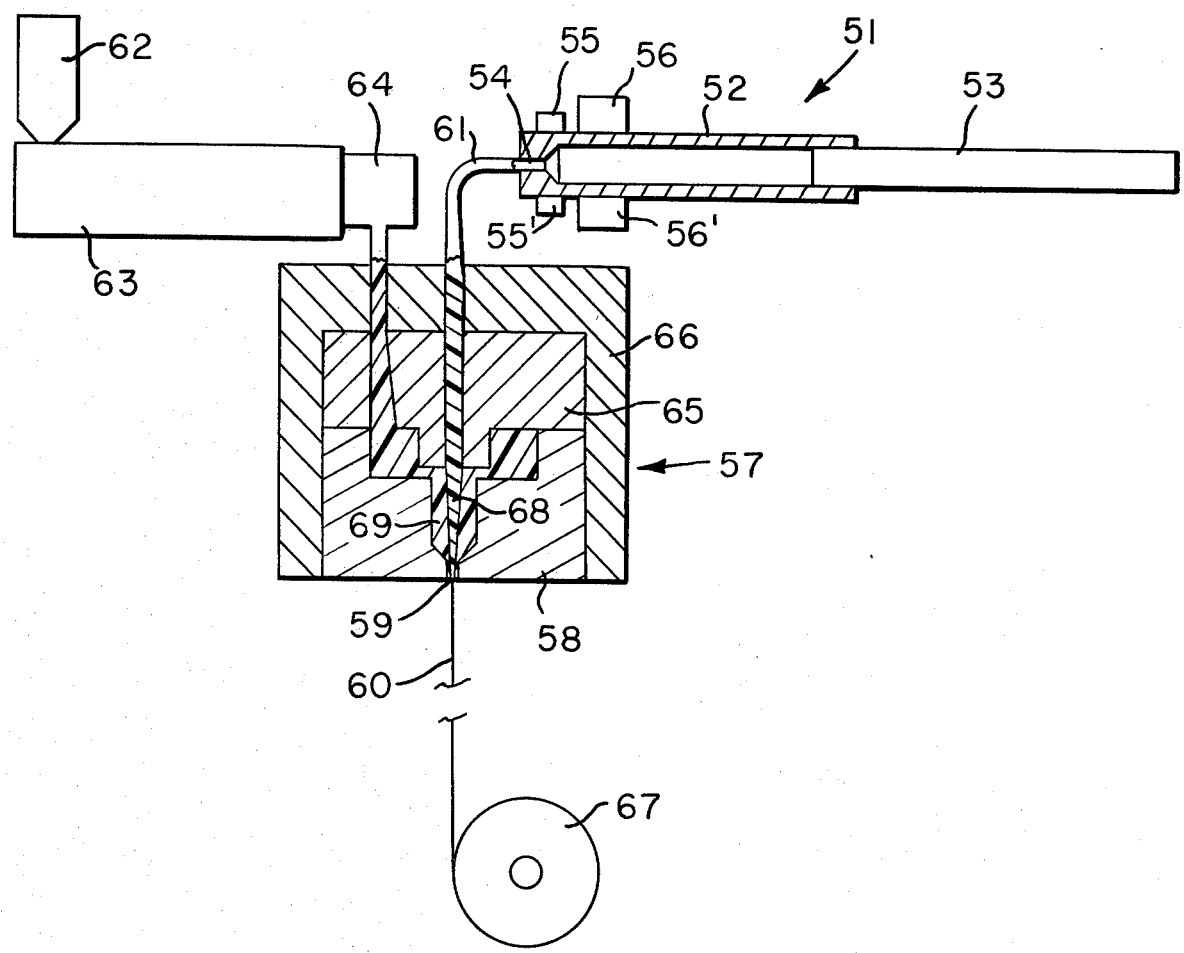
FIG. 2 is a drawing, partly schematic and partly cross-sectional, not to scale, of apparatus suitable for making optical fiber from a polymer preform.

The polymer preform is then transferred from the polymerization vessel 12 to the barrel 52 of a ram extruder 51 shown in FIG. 2. As noted above, the preform is fabricated in a shape which closely matches the barrel 52 of the ram extruder. The inside diameter of the extruder barrel is suitably slightly greater than the inside diameter of the polymerization vessel. During transfer, the preform should not be handled, or retained exposed to the atmosphere unduly, so as to minimize contamination of the preform with dust, oils from the skin, etc. It is best to transfer the preform without touching it, but if handling is necessary, lint-free gloves should be worn. If there will be any delay between fabrication of the polymer preform and extruding it, it is best to store it either by retaining it in the polymerization vessel or by holding it in the extrusion barrel. If desired, however, it can be stored in an intermediate container such as a clean plastic bag, but care should be exercized in selecting a type of plastic bag which does not contain any slip agent or sizing on its surface.

The preform is then extruded by advancing the preform through the barrel 52 with a ram 53 toward an extrusion orifice 54 through which the polymer is forced to form the core of the fiber. The ram can be either of the constant rate type, or the constant stress type, the latter being used in combination with a melt metering pump such as a gear pump. The constant rate ram is preferred because its use does not require a melt metering pump, the use of which pump introduces a potential opportunity to contaminate the polymer with foreign particles.

It is desirable to carry out the ram extrusion without melting the complete preform at the same time. The extrusion barrel 52 is heated only at its forward end by heating elements 55, 55' so that the polymer is softened just before it is forced through the extrusion orifice 54. Immediately behind the heated zone of the barrel, cooling coils 56, 56' are preferably installed to prevent conduction of heat along the barrel 52 and consequent heating of polymer farther away from the orifice. Operation in this manner results in reheating of the polymer for the minimal time needed to extrude it into fiber form, and consequently minimizes opportunity for thermal degradation of the polymer to substances which will impair the optical transparency of the fiber.

The temperatures employed for extrusion will vary somewhat with the polymer composition, but for the polymethyl methacrylate polymers described hereinabove, the temperature of the spinning head 57 will ordinarily be in the range of about 200°–240° C. and about 220°–280° C. at the forward end of the barrel where the preform is softened. For the preferred copolymers which contain up to 5% of comonomer as specified above, the preferred temperatures are 210°–220° C. at the spinning head and 240°–250° C. at the forward end of the barrel.

The cladding of the optical fiber can be applied to the core by various methods. Such methods include coextrusion and solution coating, both of which methods are well known in the art. By coextrusion is meant an operation wherein both core and cladding polymers are fed through the same orifice 59 in spinneret plate 58 from which is extruded a composite fiber 60 wherein the core polymer is completely surrounded by a substantially uniform thin layer of the cladding polymer. Coextrusion is the preferred method for making optical fibers in the present invention. Solution coating, however, is also a practical method, and, if employed, should be carried out as an in-line process step just after extrusion of the core, so as to minimize opportunity for the core to be contaminated by any material, such as particles of dust or dirt.

The spinning head 57 is of known type such as described in U.S. Pat. No. 3,992,499, specifically of the type shown in the left-hand part of FIG. 1 thereof. The spinning head 57 has a spinneret plate 58 and a meter plate 65 in a body 66. The core polymer is led from the orifice 54 of ram extruder 51 to the spinning head 57 by line 61, and is shown as molten core polymer stream 68. The cladding polymer is introduced from reservoir 62 into conventional screw extruder 63 and metered by melt metering pump 64 into the spinning head 57, and is shown as molten cladding polymer stream 69.

The cladding polymer applied to the core is optically transparent and has an index of refraction at least 0.1% lower than that of the core, preferably at least 1% lower, and most preferably at least 5% lower.

Examples of suitable cladding materials include those disclosed in British Patent Specification No. 1,037,498 such as polymers and interpolymers of vinyl fluoride, vinylidene fluoride, tetrafluoroethylene, hexafluoropropylene, trifluoromethyltrifluorovinyl ether, perfluoropropyltrifluorovinyl ether and fluorinated esters of acrylic or methacrylic acids having the structure

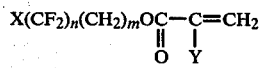

wherein X is selected from the group consisting of F, H, or Cl, and n is an integer of from 2 to 10, m is an integer from 1 to 6 and Y is either CH$_3$ or H, and copolymers thereof with esters of acrylic and methacrylic acids with lower alcohols such as methanol and ethanol. Copolymers of

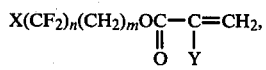

where X, Y, m and n are as defined above with the methyl and ethyl esters of acrylic and methacrylic acids and which are substantially amorphous constitute a preferred class of polymers.

Fluorinated polymers which contain pendant side chains containing sulfonyl groups such as disclosed in U.S. Pat. No. 3,849,243, and fluorine-containing elastomers such as those disclosed in U.S. Pat. Nos. 2,968,649 and 3,051,677 can also be used. Others include copolymers of tetrafluoroethylene with other monomers such as hexafluoropropylene and perfluoroalkyl perfluorovinyl ether as disclosed in U.S. Pat. Nos. 2,946,763 and 3,132,123. Modified and unmodified copolymers of tetrafluoroethylene and ethylene as disclosed in U.S. Pat. No. 2,468,664 can also be used.

Cladding polymers which are not crystalline, i.e., which are substantially amorphous, are preferred, because optical fibers clad with a crystalline polymer tend to have higher attenuations of transmitted light than those coated with an amorphous polymer. Optical fibers clad with a crystalline polymer, however, do have utility, particularly when only a short length of optical fiber or cable is needed. When the optical fiber or cable will be used in short lengths where it is subjected to high temperatures, the core and cladding should be polymers which will not soften at the high temperatures, and many polymers suitable in such cases tend to be crystalline. When a crystalline polymer is employed as cladding, however, best results (i.e., lowest attenuation of transmitted light) are attained when the optical fiber is made under such conditions that the polymer cladding has the highest transparency attainable by quickly quenching it after polymer extrusion.

Regardless of whether the fiber is made by coextrusion or by core extrusion followed by solution coating of the cladding, the diameter of the extrusion orifice 59 can vary, depending on the desired fiber diameter, and the amount of melt draw down taken. The fiber is drawn immediately after it exits from the spinning head and while it is still in a heat-softened state in order to induce molecular orientation for the purpose of imparting toughness to the fiber. The machine draw ratio is the ratio of the cross-sectional area of the die orifice to the cross-sectional area of the optical fiber if it is made by coextrusion or to the cross-sectional area of the core of the optical fiber if it is made by solution coating.

The diameter of the core of the optical fiber can vary from relatively thin to relatively thick constructions. A suitable diameter range is 50 to 500 $\mu$m. If the light source is large, e.g., from an LED (light emitting diode), a thick core has the advantage in its ability to capture a greater proportion of incident light, but has the disadvantage of having a larger minimum bending radius. If the light source is small, e.g., a laser, a relatively thin core is suitable for capturing incident light and has the advantage of a smaller minimum bending radius.

Since the cladding material reflects light traveling through the core, the thickness of the cladding generally is not critical, so long as its thickness is at least a few wavelengths of the light to be transmitted. An example of a suitable range of thickness of the cladding is about 5 to 50 $\mu$m, preferably 10 to 20 $\mu$m.

Line speed following extrusion can vary widely, depending on the capability of the equipment employed. Line speeds of 15 to 90 m/min (50 to 300 ft/min) are typical, but higher and lower speeds can also be used. Speeds in the range of 35 to 60 m/min (120 to 200 ft/min) provide highly satisfactory results. A cross-flow of air blown by means not shown can be used to quench the freshly extruded fiber; air flow velocities of 3 to 15 cm/sec (0.1 to 0.5 ft/sec) are suitable. The drawn optical fiber is wound up on drum 67.

Optical fibers made in accordance with the present invention have remarkably low attenuations of transmitted light. Optical fibers having attenuations of less than 400 dB/km (decibles per kilometer) at 656 nm are routinely made by the present invention, and attenuations below 300 dB/km, such as 274 dB/km, have been attained.

In the examples which follow, which are intended to be exemplary and not limiting as to the invention claimed, all boiling points given are uncorrected.

Attenuation of transmitted light was measured as described by E. A. J. Marcatili, "Factors Affecting Practical Attenuation and Dispersion Measurements," *Optical Fiber Transmission II, Technical Digest*, Optical Society of America, 1977, paper TuE1. For the measurements reported herein, the light source was a tungsten-halogen (incandescent) projector lamp powered by a DC voltage and current stabilized supply, and the wavelength used was selected with an interference filter having a peak wavelength of 656.3 nm, band width of 10 nm, 50% minimum transmission and average transmission of side bands of $10^{-4}$, specifically, an Ealing-IRI interference filter 26-9357 (76–77 catalog). The input end of the fiber was placed at the circle of least confusion of the source. Numerous experiments indicated that the $\log_{10}$ power was linear with length, and therefore that for practical purposes transmission was at a steady state.

EXAMPLE 1

A. Purification of Glycol Dimercapto Acetate (GDMA)

A 200-ml round-bottom flask was charged with 100 ml of glycol dimercapto acetate (Evans Chemetics, Inc., indicated to be 96.6% pure). Distillation was conducted with a 20-cm Vigreau column. A 20-ml foreshot was collected at 0.28 to 0.2 mm Hg absolute at condensing temperature of 80° to 118° C. and discarded. A 60-ml cut for use in polymerization runs was collected at 0.18–0.12 mm Hg absolute at condensing temperatures of 115°–122° C. Analysis by gas-liquid chromatography indicated 99% purity.

B. Purification of Ethyl Acrylate (EA)

Four hundred ml of ethyl acrylate (Rohm & Haas) was permitted to flow by gravity through a 38-mm diameter ×10-cm deep of basic aluminum oxide, activity grade 1 (alumina Woelm B, Akt. 1; Woelm Pharma GmbH & Co. D-3440 Eschweg) into a 500-ml round bottom flask containing about 0.5 g N,N'-diphenyl-paraphenylene diamine (DPPD) as polymerization inhibitor. The flask was fitted with a 15-mm diameter × 45-cm glass helix packed column and a still head. Distillation was conducted at atmospheric pressure. Approximately 115 ml foreshot was discarded at boiler temperatures up to 101° C; 200 ml of polymerization grade comonomer was collected at boiler temperatures between 100.5° and 101.5° C. Analysis by gas-liquid chromatography indicated purity Exceeding 99%.

C. Purification of Methyl Methacrylate (MMA)

A 1650-ml charge of methyl methacrylate monomer (Du Pont Type H112, which contains hydroquinone inhibitor) was permitted to flow by gravity through a 90-mm diameter × 8-cm deep bed of basic aluminum oxide into a 2-l round-bottom flask containing 0.5 g DPPD inhibitor. The monomer was distilled through a 25-mm diameter × 56-cm high column packed with glass helices at a high reflux ratio. Four hundred ml were collected as a foreshot at condensing temperatures up to 101° C. at atmospheric pressure and discarded; the still was cooled and blanketed with filtered argon. The next day an additional 100-ml foreshot was collected and discarded, and a 550-ml product fraction was collected in an argon filled dropping funnel at 1.67 ml/min at a condensing temperature of 101° C. at atmospheric pressure. The MMA was mixed in receiving vessel 3 of FIG. 1 with a magnetically driven magnet (not shown in FIG. 1) coated with polytetrafluoroethylene (PTFE).

About 260 ml of the MMA was discharged from the funnel into an attached 2-l argon-flushed glass mixing vessel; 2.64 ml of a solution of 2.64 ml of ethyl acrylate, 2.64 ml of glycol dimercapto acetate, and 0.1610 g of 2,2'-azo-bis(isobutyronitrile) (Vazo ® 64) was injected into the MMA through a serum stopper and PTFE stopcock. Then the balance of 520 ml of MMA was run into the mixing vessel and mixed with the other ingredients by a magnetically driven PTFE-coated impeller to produce a solution of 99.75 mol % MMA, 0.25 mol % EA, 0.17 mol % (based on monomer) GDMA and 0.01 mol % (based on monomer) Vazo ® 64. The remaining 30 ml of MMA monomer was retained for analysis of organic and metallic impurities. By gas chromatography, there was no detectable biacetyl in the MMA (detection limit, 2 ppm). By atomic absorption spectroscopy, the MMA contained no detectable chromium (detection limit 10 ppb) and 30 ppb iron (detection limit 20 ppb).

Half of the mixture was discharged by argon pressure through an 0.2 μm (micrometer) pore "Millipore" filter and an FEP (copolymer of tetrafluoroethylene and hexafluoropropylene) tube into a rigorously cleaned chromium-plated stainless steel tube having an inside diameter of 28.7 mm (1.13 in) sealed at the bottom with a PTFE "O" ring gasketed stainless steel piston and at the top with a PTFE plug. After filling the tube, the PTFE plug was removed and immediately replaced with a PTFE gasketed piston. The second half of the monomer mixture was similarly discharged into a gold-plated stainless steel tube sealed with gold plated pistons. The sealed gold plated tube was placed in a freezer at −20° C.

D. Polymerization

The chromium-plated tube was placed in a heat transfer jacket and the contents were pressurized to 24.3 kg/cm² (345 psig) by a pneumatic cylinder operating on the top piston. Silicone heat transfer fluid was pumped through the jacket according to the following schedule:

| Elapsed Time | Temperature | Heating Rate | Dilatometric Conversion |
|---|---|---|---|
| 0–16 hrs | 60° C. | nil | 53.4% |
| 16–17 | 70 | nil | 70% |
| 17–18.5 | 70–130 | 40° C./hr | — |
| 18.5–19.5 | 130 | nil | — |
| 19.5–20 | 130–100 | ca. −60° C./hr | — |
| 20–20.5 | 100 | — | 100.2% |

At this time the pressure was released, and the system was allowed to cool further.

The polymer rod was removed from the polymerization tube, small samples were taken for analysis, and the rod was placed in a polyethylene bag without handling and overwrapped with aluminum foil.

The contents of the gold-plated tube were polymerized in the same fashion. Properties of the polymers are given in Table I.

E. Extrusion

The extrusion equipment as described herein in FIG. 2 was employed, with a spinning temperature of 215° C. and a line speed of 36.6 m/min (120 ft/min). The core of the optical fiber was made from the polymer rod fabricated in part D of this example, which was extruded by the constant rate ram extrusion method. The cladding polymer, which was extruded with a conventional screw extruder, was a copolymer of 20% by weight of methyl methacrylate and 80% by weight of

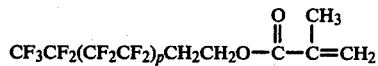

(p is 1 to 8, with ca. 90% by weight being that where p is 2 and 3) having an inherent viscosity of 0.50 (measured on a 0.5% (wt./vol.) solution in 1,1,2-trichloro-1,2,2-trifluoroethane at 20° C.) and a melt index of 6 at 230° C. (measured by ASTM D-2116-66 with an orifice of 2.095 mm and a weight of 2160 gm). The screw extruder barrel temperature employed ranged from 227° C. near the hopper to 247° C. at the discharge end of the barrel.

The perform made in the gold-plated tube was similarly used to make optical fiber.

Summary data are included in Table I.

TABLE I

| Plating of polymerization tube | | Chromium | Gold |
|---|---|---|---|
| Polymer Properties | | | |
| Inherent Visc., dl/g | | 0.432 | 0.438 |
| Residual Monomer, % by wt. | | 1.05 | 0.96 |
| Machine draw ratio | | 5.20 | 5.33 |
| Fiber Properties | | | |
| Diameter μm | | 401 ± 10 | 396 ± 13 |
| Cladding thickness μm | | 16 | 16 |
| Attenuation } 656 nm | cm$^{-1}$ × 10$^3$ | 0.71 | 0.73 |
| Attenuation | dB/km | 307 | 316 |
| Toughness* | breaks | 2 | — |

*Number of fiber breaks in ten groups of ten normal wraps on a 2.38 - mm diameter (3/32 inch) steel mandrel.

EXAMPLE 2

Example 1 was repeated in a chromium-plated polymerization tube, but with the following differences. The concentration of EA comonomer was 0.5 mol %. During polymerization, in Example 2B, 60° C. was maintained for 15.75 hrs. and in Example 2A, the final temperature employed was 120° C. During spinning of fibers, in Example 2A, spinning temperature was 225° C., and in Example 2B, 220° C. Property data are shown in Table II.

TABLE II

| Example | 2A | 2B |
|---|---|---|
| Polymer Properties | | |
| Residual Monomer % by wt. | 1.2,1.3 | 1.1 |
| Machine draw ratio | 5.61 | 5.39 |
| Fiber Properties | | |
| Diameter μm | 386 | 394 |

TABLE II-continued

| Example | | | 2A | 2B |
|---|---|---|---|---|
| Cladding thickness μm | | | 16 | 16 |
| Attenuation | cm$^{-1}$ × 10$^3$ | | 0.83 | 0.78–0.92 |
| | 656 nm | | | |
| Attenuation | dB/km | | 360 | 337–401 |

EXAMPLE 3

Example 1 was repeated in a chromium-plated polymerization vessel, but with the following differences, a variable amount of EA comonomer was used in three runs as indicated in Table III. During spinning of fibers, the spinning temperature was 214° C. in Examples 3A and 3C, and 215° C. in Example 3B. Property data are shown in Table III.

TABLE III

| Example | | 3A | 3B | 3C |
|---|---|---|---|---|
| EA Concentration, mol % | | 0 | 0.25 | 0.5 |
| Polymer Properties | | | | |
| Inherent Visc. dl/gm | | — | 0.432 | — |
| Residual Monomer % by wt. | | 0.7–1.05 | 1.05 | 0.9–1.0 |
| Machine draw ratio | | 5.61 | 5.20 | 5.76 |
| Fiber Properties | | | | |
| Diameter μm | | 386 | 401 ± 10 | 381 |
| Cladding thickness μm | | 16 | 16 | 16 |
| Attenuation | cm$^{-1}$ × 10$^3$ | 0.73 | 0.71–0.73 | 0.63–0.71 |
| 656 nm | | | | |
| Attenuation | dB/km | 316 | 307–316 | 274–307 |
| Toughness | breaks | 0 | 2 | 0 |

EXAMPLE 4

Example 1 was repeated in a chromium-plated polymerization vessel, but with the following differences. The ethyl acrylate comonomer concentration was varied as shown in Table IV. Various chain transfer agents were used, as indicated in the table. During spinning of fibers, the spinning temperature was 215° C. in Examples 4A and 4C, and 214° C. in Example 4B.

TABLE IV

| Example | 4A | 4B | 4C |
|---|---|---|---|
| Polymerization variables | | | |
| EA Concentration, mol % | 0.25 | 0.5 | 0.25 |
| Chain transfer agent, Identity | GDMA (1) | DMDEE (2) | C$_4$SH (3) |
| Conc., mol % (based on monomer) | 0.17 | 0.17 | 0.21 |
| Polymer Properties | | | |
| Inherent Visc., dl/gm | — | 0.430 | 0.431 |
| Residual Monomer, % by wt. | 0.7–1.05 | 1.61 | 1.29 |
| Machine draw ratio | 5.20 | | |
| Fiber Properties | | | |
| Diameter μm | 401 ± 10 | | |
| Cladding Thickness μm | 16 | | |
| Attenuation cm$^{-1}$ × 10$^3$ | 0.71–0.73 | 0.80–0.89 | 0.78–0.79 |
| 656 nm | | | |
| Attenuation dB/km | 307–316 | 348–385 | 340–344 |
| Toughness breaks | 2 | 1 | 0 |

(1) glycol dimercapto acetate
(2) 2,2'-dimercapto diethyl ether
(3) n-butyl mercaptan

EXAMPLE 5 AND COMPARATIVE EXAMPLE A

Example 1 was repeated in a chromium-plated pressure vessel, but with the following differences. The amount of EA comonomer and the type and amount of chain transfer agent were varied, and the sealing gaskets on the piston closures of the polymerization tube were varied. Most importantly, the final temperature was varied to demonstrate the effect of that variable. Those variables and properties are summarized in Table V.

TABLE V

| Example | 5A | 5B | 5C | 5D | Control A |
|---|---|---|---|---|---|
| Polymerization Variables | | | | | |
| EA Conc. mol % | 0.5 | 0.5 | 0.25 | 0.5 | 0.5 |
| Chain transfer agent, Identity | GDMA | GDMA | GDMA | GDMA | C$_4$SH |
| Conc., mol % (based on monomer) | 0.17 | 0.17 | 0.17 | 0.17 | 0.225 |
| Seal Material | EPR rubber | PTFE | PTFE | PTFE | EPR rubber |
| Final Temp. °C. | 120 | 130 | 135 | 140 | 105 |
| Polymer Properties | | | Bubble near axis | Bubbles near axis | |
| Inherent Visc. dl/gm | 0.416 | — | — | — | 0.410 |
| Residual Monomer % by wt. | 1.3 | 0.9–1.0 | 1.2–1.3 | 1.27 | 2.50 |
| Spinning Temp. °C. | 214 | 214 | 215 | 215 | 219 |
| Machine draw ratio | 6.17 | 5.76 | 5.39 | 5.61 | 19.3 |
| Fiber Properties | | | | | |
| Diameter μm | 368 | 381 ± 15 | 394 | 386 | 208 |
| Cladding thickness μm | 8 | 16 | 20 | 16 | 11 |
| Attenuation cm$^{-1}$ × 10$^3$ | 0.92–0.97 | 0.63–0.71 | 0.77–0.79 | 0.79–0.83 | 1.16 |

TABLE V-continued

| Example | | 5A | 5B | 5C | 5D | Control A |
|---|---|---|---|---|---|---|
| Attenuation 656 nm dB/km | | 401–420 | 274–307 | 334–343 | 334–362 | 505 |
| Toughness | breaks | 0 | 0 | 0 | 0 | — |

In Control A the final temperature was only 105° C., and 2.5% of unpolymerized MMA remained. When the final temperature is even lower, such as 70° C., the residual monomer remaining will be even higher. At a final temperature of 140° C., as Example 5D, it appears that a small amount of monomer is regenerated, which results in formation of some bubbles in the polymer.

EXAMPLE 6

Example 1 was repeated in a chromium-plated polymerization vessel, but with the following differences. The chain transfer agent and piston seals were varied. Most importantly, the spinning temperature was raised to 225° C. in Example 6B, which caused the fiber to exhibit a somewhat higher number of breaks; this lower toughness is associated with a lower degree of axial molecular chain orientation. The data are summarized in Table VI.

TABLE VI

| Example | 6A | 6B |
|---|---|---|
| Polymerization Variables | | |
| EA Conc., mol % | 1.5 | 1.5 |
| Chain transfer agent, Identity | DMDEE | GDMA |
| Conc., mol % (based on monomer) | 0.17 | 0.17 |
| Seal Material | EPR rubber | PTFE |
| Polymer Properties | | |
| Inherent Visc., dl/gm | 0.435 | 0.425 |
| Residual Monomer, % by wt. | 1.3 | 1.00 |
| Spinning Temp., °C. | 214 | 225 |
| Machine draw ratio | 5.76 | 5.76 |
| Fiber Properties | | |
| Diameter μm | 381 | 381 |
| Cladding thickness μm | 16 | 16 |
| Attenuation 656 nm $cm^{-1} \times 10^3$ | 0.85–0.86 | 0.92 |
| Attenuation dB/km | 367–375 | 399 |
| Toughness breaks | 0 | 10 |

EXAMPLE 7 AND COMPARATIVE EXAMPLE B

Example 1 was repeated twice in a chromium-plated polymerization vessel, but with the following differences. No comonomer was used, i.e., the monomer was all methyl methacrylate. In both cases, the residual monomer was in the range 0.7 to 1.05% by wt. Spinning temperatures were 214° C. in Example 7 and 216° C. in Control B.

In Example 7, the optical fiber had an attenuation at 656 nm of 316 dB/km (0.73 $cm^{-1} \times 10^3$). In Control B, the polymer preform was handled by several people, then cleaned as thoroughly as possible before extrusion; the optical fiber had attenuations in the range 753 to 884 dB/km (1.7 to 1.9 $cm^{-1} \times 10^3$). This demonstrates the care which must be exercized to avoid deleterious contamination of the polymer.

EXAMPLE 8 and COMPARATIVE EXAMPLE C

Example 1 was repeated twice in a chromium-plated polymerization vessel. In Example 8, the optical fiber produced had an attenuation of 319 dB/km at 656 nm.

In Comparative Example C, biacetyl was deliberately introduced into the charge to the polymerization vessel. Analysis by gas chromatography indicated the biacetyl concentration of the charge to be 9 ppm. The optical fibers produced from the resulting polymer had an attenuation of 424 dB/km at 656 nm.

EXAMPLE 9

Example 1 was repeated in a chromium-plated polymerization vessel, but using deuterated methyl methacrylate in place of the MMA, and only one preform was prepared. The monomer used was 99.88% MMA-$d_8$ and 0.113% of approximately equal amounts of methyl-$d_3$ acrylate and methyl-$d_3$ acrylate-2,2-$d_2$. Into 260 ml of the monomer was placed 1.37 ml of a solution of 0.0803 g of Vazo ® 64 and 1.24 ml of GDMA in another 1.50 ml of the MMA-$d_8$. This gave a GDMA concentration 0.16 mol %, based on monomer. The heating schedule was as follows.

| Elapsed Time hr. | Temperature °C. | Heating Rate °C./hr | Dilatometric Conversion % |
|---|---|---|---|
| 0–15.75 | 60 | nil | 99.2 |
| 15.75–16 | 60–130 | 280 | ca. 99.2 |
| 16–17 | 130 | nil | |
| 17–17.5 | 130–100 | −60 | |
| 17.5–18 | 100 | nil | 102.1 |

The deuterated polymer obtained had an inherent viscosity of 0.426 dl/g, and contained 1.17 wt % residual monomer. The polymer contained 239 μg of proton per gram of polymer, as determined by nuclear magnetic resonance at 60 MHz. Maximum transmission of light occurred at wavelengths of 690 and 790 nm, at which wavelengths the attenuation of light was 225 dB/km.

What is claimed is:

1. An improved process for making an optical fiber which consists essentially of organic high polymers, said fiber consisting of a core and cladding, said core being fabricated of a first polymer which contains a major proportion of methyl methacrylate units, which comprises the steps (1) (a) mixing in a sealed system vinyl monomers of which at least 60 mol % is methyl methacrylate, said monomers containing 0 to 10 ppm biacetyl and 0–500 ppb of transition metal ions and being substantially free of particulate matter, with a free radical polymerization initiator and a chain transfer agent;

(b) transferring said mixture in a sealed system to a polymerization vessel, and closing said vessel;

(2) maintaining said mixture without a free liquid surface in said vessel under a pressure of 7 to 25 kg/cm², while simultaneously: maintaining the temperature of said mixture below about 70° C. until conversion to polymer is at least 60% complete dilatometrically, raising the temperature at a rate to reach a temperature of 90° to 100° C. at the time that conversion to polymer is at least 95% complete dilatometrically, and continuing to raise the temperature at about the same rate to a temperature in the range of 115° to 140° C., holding the temperature in said range for at least a half hour and cooling to form a solid preform of said first polymer;

(3) (a) transferring said solid preform of said first polymer to the barrel of a ram extruder adapted to receive it;

(b) advancing said solid preform through said barrel with a ram into a heated zone, whereby said preform is softened only at its forward end, and extruding said core of said fiber, and (c) applying to said core a second polymer which is substantially amorphous and which has an index of refraction below that of said first polymer, to form said cladding of said fiber.

2. The process of claim 1 wherein in step (1) (a) the methyl methacrylate has been purified by contact with aluminum oxide followed by distillation.

3. The process of claim 1 wherein in step (1) (a) all the vinyl monomers have been purified by contact with aluminum oxide followed by distillation.

4. The process of claim 1 wherein in step (1) (a) the polymerization initiator is an azo initiator.

5. The process of claim 4 wherein the azo initiator is used in an amount of 0.001 to 0.05 mol %, based on total monomer.

6. The process of claim 1 wherein in step (1) (a) the chain transfer agent has two mercapto groups.

7. The process of claim 6 wherein the chain transfer agent is used in an amount of 0.1 to 0.5 mol %, based on total monomer.

8. The process of claim 1 wherein in step (1) (a) the vinyl monomers comprise at least 90 mol % methyl methacrylate.

9. The process of claim 8 wherein the vinyl monomers are at least 95 mol % methyl methacrylate and 0 to 5 mol % from the group consisting of methyl acrylate, ethyl acrylate and ethyl methacrylate.

10. The process of claim 1 wherein in step (1) (a) the vinyl monomers comprise deuterated vinyl monomers.

11. The process of claim 10 wherein said deuterated vinyl monomers comprise methyl methacrylate-$d_8$.

12. The process of claim 1 wherein in step (1) (b), during transfer of said mixture to said polymerization vessel, any solid particles larger than a size within the range 0.2 to 1 $\mu$m are removed.

13. The process of claim 12 wherein the solid particles are removed by filtering through a filter whose pore size is in the range 0.2 to 1 $\mu$m.

14. The process of claim 1 wherein in step (1) (b) the inside surface of the polymerization vessel is plated with an inert metal.

15. The process of claim 14 wherein the cavity of the polymerization vessel is cylindrical.

16. The process of claim 15 wherein the diameter of the cylindrical cavity is from 25 to 30 mm.

17. The process of claim 1 wherein in step (2) the final temperature is in the range of 125° to 135° C.

18. The process of claim 17 wherein the final temperature is held in said range for at least one hour.

19. The process of claim 1 wherein in step (3) (b) the ram is advanced at a constant rate.

20. The process of claim 1 wherein in step (3) (c) the second polymer has an index of refraction at least 1% lower than that of said first polymer.

21. The process of claim 1 wherein in step (3) (c) the second polymer is applied by coating from solution.

22. The process of claim 1 wherein in step (3) (c) the second polymer is applied by coextrusion.

23. The process of claim 22 wherein the second polymer is a copolymer of $$X(CF_2)_n(CH_2)_mOC-C=CH_2,$$
$$\overset{\|}{O} \ \overset{|}{Y}$$

wherein X is F, H or Cl; Y is $CH_3$ or H; m is an integer from 1 to 6; and n is an integer from 2 to 10, with at least one of the methyl or ethyl esters of acrylic or methacrylic acids.

24. The process of claim 22 wherein the second polymer is a copolymer of methyl methacrylate and $$CF_3CF_2(CF_2CF_2)_pCH_2CH_2O-\overset{O}{\overset{\|}{C}}-\overset{CH_3}{\overset{|}{C}}=CH_2$$

where p takes the values of integers from 1 to 8 with a major proportion being that where p is 2 and 3.

25. The process of claim 21 wherein in step (3) (c) said core is drawn before applying said second polymer to the core.

26. The process of claim 22 wherein in step (3) (c) following coextrusion said fiber is drawn.

27. An improved process for making an optical fiber which consists essentially of organic linear high polymers, said fiber consisting of a core and cladding, said core being fabricated of a first polymer which contains a major proportion of methyl methacrylate units, which comprises the steps (1) (a) mixing in a sealed system vinyl monomers which have been purified by contact with aluminum oxide followed by distillation, of which at least 95 mol % is methyl methacrylate, said monomers containing 0 to 10 ppm biacetyl and 0–500 ppb of transition metal ions and being substantially free of solid particulate matter, with an azo polymerization initiator in an amount of 0.001 to 0.05 mol % based on total monomer and a chain transfer agent which has two mercapto groups in an amount of 0.1 to 0.5 mol % based on total monomer;

(b) transferring said mixture in a sealed system through a filter whose pore size is in the range 0.2 to 1 $\mu$m to a polymerization vessel which has a cylindrical cavity whose diameter is from 25 to 30 mm and which is plated with an inert metal, and closing said vessel;

(2) maintaining said mixture without a free liquid surface in said vessel under a pressure of 7 to 25 kg/cm², while simultaneously: maintaining the temperature of said mixture below about 70° C. until conversion to polymer is at least 60% complete dilatometrically, raising the temperature at a rate to reach a temperature of 90° to 100° C. at the time that conversion to polymer is at least 95% complete dilatometrically, and continuing to raise the temperature at about the same rate to a temperature in the range of 125° to 135° C., holding the temperature in said range for at least one hour and cooling to form a solid preform of said first polymer;

(3) (a) transferring said solid preform of said first polymer to the barrel of a ram extruder adapted to receive it;

(b) advancing said solid preform through said barrel at a constant rate with a ram into a heated zone, whereby said preform is softened only at its forward end, and extruding said core of said fiber, and
(c) coextruding a copolymer of methyl methacrylate and

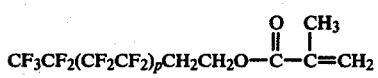

where p takes the values of integers from 1 to 8 with a major proportion being that where p is 2 and 3 to form said cladding of said fiber, and drawing the coextruded fiber.

28. A process for making a polymer having a major proportion of methyl methacrylate units comprising combining vinyl monomers of which at least 60 mol % is methyl methacrylate with a free radical polymerization initiator and a chain transfer agent, maintaining said mixture without a free liquid surface under a pressure of 7 to 25 kg/cm$^2$ while simultaneously: maintaining the temperature of said mixture below about 70° C. until conversion to polymer is at least 60% complete dilatometrically, raising the temperature at a rate to reach a temperature of 90° to 100° C. at the time that conversion to polymer is at least 95% complete dilatometrically, and continuing to raise the temperature at about the same rate to a temperature in the range of 115° to 140° C., holding the temperature in said range for at least a half hour and cooling.

* * * * *